July 18, 1961 S. POGANSKI 2,992,538

THERMOELECTRIC SYSTEM

Filed Feb. 11, 1960

Inventor:

SIEGFRIED POGANSKI

By Toulmin & Toulmin

Attorneys

1

2,992,538

THERMOELECTRIC SYSTEM

Siegfried Poganski, Langen, Hessen, Germany, assignor to Licentia Patent-Verwaltungs-G.m.b.H., Frankfurt am Main, Germany Filed Feb. 11, 1960, Ser. No. 8,113

Claims priority, application Germany Feb. 13, 1959

6 Claims. (Cl. 62—3)

The invention relates to thermoelectric systems consisting of thermocouple elements, and particularly to such systems as are employed in refrigeration plants.

Thermoelectric systems can be used for cooling and/or heating in that a direct electrical current is passed through a thermocouple element arrangement. During the flow of the current, one terminal of the two thermocouple element arms heats, whereas the other cools. By the cooling of this terminal, heat can be withdrawn from its surroundings, thereby producing cold. Similarly, heat can be imparted to the surroundings of the heating terminal.

It is well known that these thermocouple elements can be arranged in a wall of a cooling chamber in such a manner that the cold terminal portions are located on one side of the wall and the hot terminal portions on the other side thereof.

The known construction of a thermocouple element has been found to be particularly disadvantageous for building up a thermoelectric system when the thermocouple element to be used has arms which are relatively short, that is one tenth to one half of their thickness. Thus, if it is intended to employ a thermocouple element with arms which are of short length, this would mean that thin walls would have to be provided for the cooling chamber and as a result the thermal insulation would be less effective. For the known contact-making method presents difficulties in this respect owing to the occurring contact resistances. These increase very considerably in the case of the otherwise preferred employment of the thermocouple elements with arms which are relatively short in length.

In order to remove these disadvantages I have already proposed in my co-pending patent application, Serial Number 788,569, filed January 23, 1959, assigned to the same assignee as the instant application, to provide a thermoelectric system comprising a first heat-conducting body, a first thermocouple element arm, a second heat-conducting body, a second thermocouple element arm and a third heat-conducting body, all of which are stacked to form a block-shaped body, so that the contact surfaces between the heat-conducting bodies and the two thermocouple element arms form cross-sectional areas of the block-shaped body, and that a portion of the first and third heat-conducting bodies project from the block-shaped body in one direction and a portion of the second heat-conducting body projects therefrom in the opposite direction.

In the thermoelectric system according to the invention of my co-pending patent application, supra one or each of the two thermocouple element arms is in the shape of a rectangular parallelepiped (or ashlar), the ratio between the length of the arm, measured in centimeters, and the cross-section of the arm, equally measured in square centimeters being less than 1.

According to another feature of the thermoelectric system according to the invention of my co-pending patent application, supra, the portions of the heat-conducting bodies projecting from the block-shaped body are constructed as heat transfer means. Furthermore, it is recommended that the contact surfaces between the heat-conducting bodies and the two thermocouple element arms be arranged at least aproximately parallel and be at least approximately of the same size and shape.

2

Another preferred feature of the thermoelectric system according to my co-pending patent application, supra, is that the block-shaped body itself is axially symmetrical to the axis extending vertically to the parallel contact surfaces between the heat-conducting bodies and the thermocouple element arms.

While the invention disclosed in my co-pending application has thus overcome the disadvantages of the art, I have now found that there is room for even further improvement, and, accordingly, the present invention is concerned with an improved thermoelectric system based on the general type described in my co-pending patent application, supra.

More in particular, it is an object of the present invention to provide a thermoelectric system of the aforementioned type which has a greater refrigerating power without increasing the number of thermally conductive bodies.

It is another object of the present invention to provide a thermoelectric system of the aforementioned type with a greater voltage drop than is obtained in any other system.

It is a further object of the present invention to provide a thermoelectric system of the aforementioned type which can be operated with smaller current intensities.

It is still another object of the present invention to provide a thermoelectric system of the aforementioned type wherein the thermally conductive bodies do not receive electric potential, thus making it possible to use electrically conductive or electrolytic cooling or contact media.

These objects are achieved by the thermoelectric system of the present invention of the same general type as the one described in my co-pending patent application, supra, but which is distinguished therefrom by the following features: Between every two of the heat-conducting bodies are disposed an even number of thermocouple element arms, the half of which is n-conductive and the other end of which is p-conductive. The thermocouple element arms are connected in series alternatingly with respect to their n- and p-type conductivities. The warm and the cold portions of the thermocouple element arms, that is the heat-radiating and the heat-absorbing contact points thereof, are in contact each with a different neighboring heat-conducting body in such a manner that they are electrically insulated, but thermally conductive with respect to the heat-conductive bodies.

Thus, a plurality of thermocouple elements is connected in series electrically but is connected in parallel thermally.

According to the invention the thermocouple element arms can be disposed vertically relative to the direction of the temperature gradient between the heat-conductive bodies. However, they can also be disposed in one plane horizontally or in a plurality of planes horizontally relative to the temperature gradient between the heat-conductive bodies.

Preferably, the thermocouple element arms are arranged in a checkerboard-like manner according to their n- and p-type conductivities and in a plane extending vertically relative to the direction of current flow through them.

According to a further feature of the invention mechanical connecting means are provided for maintaining the thermocouple element arms with their respective heat-radiating and heat-absorbing contact points in firm, heat-exchanging contact with the heat-conductive bodies.

The thermoelectric system of the invention offers considerable advantages not only over the art, but also over the co-pending application, supra. Since a plurality of thermocouple element arms are provided and are connected in series electrically and connected in parallel thermally, a greater heat-absorption and, hence, a greater refrigerating power, is obtained, without requiring additional heat-conductive bodies. The voltage drop is increased and smaller current intensities can be used. Furthermore, the heat-conductive bodies do not have any electric potential, which makes it possible to use electrically conductive or electrolytic substances as contact media.

The characteristic features as well as the advantages of the present invention will become even more apparent upon the following description of the accompanying drawings, in which FIGURE 1 is a somewhat schematic, sectional view of the thermoelectric system of the present invention, wherein the thermocouple element arms are disposed vertically with respect to the temperature gradient between the heat-conductive bodies;

Figure 1:
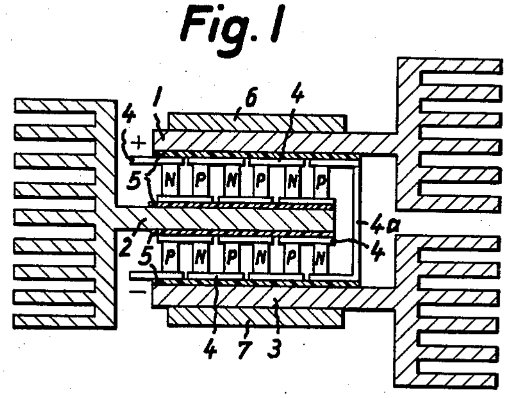

Referring now to the drawings somewhat more in detail and turning first to FIGURE 1, the thermoelectric system of the invention comprises a first heat-conductive body 1, a second heat-conductive body 2 and a third heat-conductive body 3, the heat-conductive body 2 projecting in one direction and the heat-conductive bodies 1 and 2 projecting in the opposite direction. The three heat-conductive bodies form two spaces, a first space between bodies 1 and 2, and a second space between the bodies 2 and 3. Each space receives an even-numbered plurality of n- and p-type conductive thermocouple elements as, for example, those element arms in each space designated with n and p, respectively, n indicating the n-type conductive arms and p designating the p-type conductive arms. There is provided in each space a group of n-conductive thermocouple element arms and a group of equal number of p-conductive thermocouple element arms. The element arms are disposed in an alternating fashion with respect to their n- and p-type conductivities, that is, a p-type follows an n-type, whereupon follows an n-type, which is, in turn, followed by a p-type and so forth in alternating fashion, the last arm being of the opposite conductive type to the first arm. Furthermore, it will be of advantage to arrange the element arms in a checkerboard-like manner, so that the first element arm of the second row of element arms is of the opposite conductive type to the first element arms of the first row of thermocouple element arms. The p-type thermocouple element arms and the n-type thermocouple element arms are connected in series by electric conductors 4. The thermocouple element arms can be fixedly soldered with the conductors 4. The electric contact between the two planes of thermocouple element arms is effected by a conductor piece *4a*.

According to the invention, an electrically insulating, but thermally conductive layer 5 is provided for insulating the conductors 4 and the thermocouple element arms against the heat-conductive bodies 1, 2 and 3, while maintaining thermal conductance. It has been found of particular advantage to use a thin foil as a layer 5 as, for example, a thin micafoil. Since the voltages used in the system are rather small, the insulating layers 5 can be made very thin, so as to reduce the heat-resistance to a minimum.

The thermocouple element arms and the heat-conductive bodies form a substantially block-like body which is held together by means of mechanical connecting means as, for example, a clamp having cheeks 6 and 7. It is unnecessary to provide an insulation for the clamp cheeks 6 and 7 since, according to the invention, the heat-conductive bodies 1, 2 and 3 are not connected to an electric potential.

The heat-conductive bodies can be composed, for example, of copper or aluminum, whereas the thermocouple elements are preferably composed of semi-conductor materials as described in further detail in my co-pending application, supra. The particular material used is to be selected with a view to the highest possible electric conductivity and the lowest possible heat-conductivity. These requirements are best fulfilled by materials such as, for example, for the n-conductive arm an alloy of $Bi_2Te_3$ and $Bi_2Se_3$ and for the p-conductive arm an alloy of $Bi_2Te_3$ and $Sb_2Te_3$.

The system operates substantially as described with reference to the system in the co-pending application, supra, by selecting the direction of the direct current, for example as indicated by the signs in FIGURE 1, and passing this direct current through the thermocouple element arms and the conductors 4. Consequently, the contact points between the thermocouple element arms and the conductors 4 associated with heat-conductive body 2, are cooled, whereas the contact points at the heat-conductive bodies 1 and 3 are heated. The effect is reversed on changing the direction of the current flow.

Figures 2, 3:
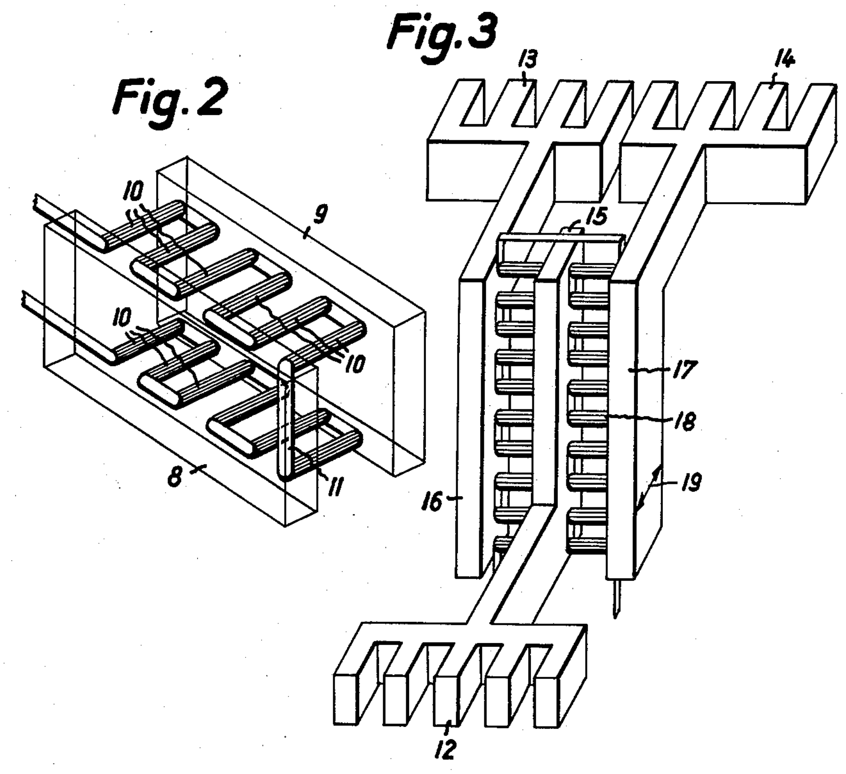
FIGURE 2 is a somewhat schematic, fragmentary, perspective and transparent view of the thermoelectric system of the present invention, with the thermocouple element arms being disposed in two differene planes.
FIGURE 3 is a somewhat schematic, perspective view of another embodiment of the thermoelectric system of the present invention, wherein the thermocouple element arms are disposed vertically relative to the direction of the temperature gradient between the heat-conductive bodies.

FIGURE 2 shows a modification, wherein the thermocouple element arms are arranged in two different planes horizontally relative to the direction of the temperature gradient between the heat-conductive bodies. For the sake of clarity only portions of two of three heat-conductive bodies are shown in the drawing, these portions being designated by 8 and 9, respectively. The thermocouple element arms 10 are electrically connected in series with one another in each plane, and electrical contact is established between the two different planes by means of a conductor piece 11. The electric insulating means have also been omitted for the sake of clarity, but correspond entirely with the insulating means 5 shown in FIGURE 1.

The embodiment shown in FIGURE 2 has the particular advantage of enabling a comparatively and compact block-shaped construction of the system. This greatly reduces the shortest distance between the cool and the warm heat-exchanging means and makes it possible to fully utilize the high thermal insulation effect of the most advanced insulating means such as, for example, all sorts of foamy substances which, in turn, justifies a reduction in strength of the insulating walls. It should be noted, however, that care must be taken to avoid thermally short-circuiting the resistance between the warm and the cold contact points of the thermocouple element arms by other elements used in the system as, for example, the mechanical connecting means maintaining the thermal contact between the thermocouple element arms and the heat-conductive bodies.

Still a further embodiment of the invention is shown in FIGURE 3 according to which the thermocouple element arms are arranged in a plane extending vertically relative to the direction of the temperature gradient between the heat-conductive bodies. The heat-exchanging portions 12, 13 and 14 of the heat-conductive bodies 15, 16 and 17 project vertically relative to the thermocouple element arms 18, with the heat-exchanger 12 of heat-conductive body 15 projecting in one direction into the warm space. The necessary minimum thickness of the thermally insulating wall is determined by the dimensions of the heat-conductive bodies in the directions of double-headed arrow 19. For thermal reasons the heat-exchangers 12, 13 and 14 are preferably arranged substantially in the middle of the heat-conductive bodies 15, 16 and 17.

It will be understood that this invention is susceptible to modification in order to adapt it to different usages and conditions and, accordingly, it is desired to comprehend such modifications within this invention as may fall within the scope of the appended claims.

What I claim is:

1. A thermoelectric system, comprising a first, a second and a third heat-conductive body, a first group of n-conductive thermocouple element arms and a first group p-conductive thermocouple element arms, said thermocouple element being connected electrically in series alternatingly with respect to their n- and p-type conductivities, second group of n-conductive thermocouple element arms and a second group of p-conductive thermocouple element arms being connected electrically in series alternatingly with respect to their n- and p-type conductivity, said first groups being disposed between said first and said second heat-conductive bodies, said second groups being disposed between said second and said third heat conductive body, said thermocouple element arms each having a heat-radiating contact area and a heat-absorbing contact area; electrically insulating but thermally conductive means between said heat-radiating and heat-absorbing contact points, respectively, of said thermocouple element arms on the one hand, and different ones of said heat-conducting bodies, respectively, on the other hand, said heat-conductive bodies and all of said thermocouple element arms forming a substantially block-shaped body, with a portion of said first and of said third heat-conductive bodies projecting from the substantially block-shaped body in one direction and a portion of the second heat-conductive body projecting from the block-shaped body in the opposite direction.

2. A thermoelectric system according to claim 1, with said thermocouple element arms being disposed in parallel relative to the direction of the temperature gradient between said heat-conductive bodies.

3. A thermoelectric system according to claim 1, with said groups of thermocouple element arms being disposed in one plane horizontally relative to the direction of the mean temperature gradient taken between the projecting portions of said heat-conductive bodies.

4. A thermoelectric system according to claim 1, with said thermocouple element arms being disposed in a plurality of planes horizontally relative to the direction of the temperature gradient between said heat-conductive bodies.

5. A thermoelectric system according to claim 1, with said thermocouple element arms being arranged in a checker-board like manner according to their n- and p-type conductivities and in a plane extending vertically relative to the direction of current flow through them.

6. A thermoelectric system according to claim 1, said electrically insulating but thermally conductive means consisting of a thin micafoil.

References Cited in the file of this patent

UNITED STATES PATENTS

| | | |
|---|---|---|
| 2,289,152 | Telkes | July 7, 1942 |
| 2,872,788 | Lindenblad | Feb. 10, 1959 |
| 2,903,857 | Lindenblad | Sept. 15, 1959 |
| 2,932,954 | Evans | Apr. 19, 1960 |

FOREIGN PATENTS

| | | |
|---|---|---|
| 1,059,939 | Germany | June 25, 1959 |
| 1,068,279 | Germany | Nov. 5, 1959 |